United States Patent
Rosenberg

(10) Patent No.: US 11,301,307 B2
(45) Date of Patent: Apr. 12, 2022

(54) PREDICTIVE ANALYSIS FOR MIGRATION SCHEDULERS

(71) Applicant: RED HAT, INC., Raleigh, NC (US)

(72) Inventor: Steven Eric Rosenberg, Or Yehuda (IL)

(73) Assignee: RED HAT, INC., Raleigh, NC (US)

( * ) Notice: Subject to any disclaimer, the term of this patent is extended or adjusted under 35 U.S.C. 154(b) by 109 days.

(21) Appl. No.: 16/520,785

(22) Filed: Jul. 24, 2019

(65) Prior Publication Data

US 2021/0026707 A1  Jan. 28, 2021

(51) Int. Cl.
*G06F 9/50* (2006.01)
*G06F 9/455* (2018.01)
(Continued)

(52) U.S. Cl.
CPC .............. *G06F 9/5088* (2013.01); *G06F 5/00* (2013.01); *G06F 9/455* (2013.01);
(Continued)

(58) Field of Classification Search
CPC .. G06F 9/455; G06F 9/45533; G06F 9/45558; G06F 2009/4557; G06F 2009/45575; G06F 9/48; G06F 9/4806; G06F 9/4843; G06F 9/485; G06F 9/4856; G06F 9/4875; G06F 9/4881; G06F 9/50; G06F 9/5005; G06F 9/5011;
(Continued)

(56) References Cited

U.S. PATENT DOCUMENTS

| 9,703,598 B2 | 7/2017 | Vincent et al. |
| 10,042,697 B2 | 8/2018 | Ahad |

(Continued)

FOREIGN PATENT DOCUMENTS

| CN | 105607948 | 5/2016 |
| CN | 104765642 | 11/2017 |

OTHER PUBLICATIONS https://static.sched.com/hosted_files/devconfcz2019/56/Predictive%20Analysis%20for%20Migration%20Schedulers.pdf.
https://www.advsyscon.com/en-us/activebatch/core-capabilities/views/operations-views/scheduling-analytics.

*Primary Examiner* — Charles M Swift
(74) *Attorney, Agent, or Firm* — Haynes and Boone, LLP

(57) ABSTRACT

Systems, methods, and machine-readable instructions stored on machine-readable media are disclosed for selecting, based on an analysis of a first process executing on a first host, at least one of a plurality of other hosts to which to migrate the first process, the selecting being further based on an analysis of the plurality of the other hosts and an analysis of processes executing on the plurality of the other hosts. At least one predictive analysis technique is used to predict an amount of time to complete migrating the first process to the selected at least one of the plurality of other hosts and an end time of the second process. In response to determining that a current time incremented by the predicted amount of time to complete migrating the first process is later than or equal to the predicted end time of the second process, a migration time at which to migrate the first process from the first host to the selected at least one of the plurality of other hosts is scheduled. At the scheduled migration time, the migration of the first process from the first host to the selected at least one of the plurality of other hosts is performed.

20 Claims, 4 Drawing Sheets

(51) Int. Cl.
*G06F 9/48* (2006.01)
*G06N 5/00* (2006.01)
*G06N 5/02* (2006.01)
*G06F 5/00* (2006.01)

(52) U.S. Cl.
CPC ...... *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4875* (2013.01); *G06F 9/4881* (2013.01); *G06F 9/50* (2013.01); *G06F 9/5005* (2013.01); *G06F 9/505* (2013.01); *G06F 9/5011* (2013.01); *G06F 9/5022* (2013.01); *G06F 9/5027* (2013.01); *G06F 9/5083* (2013.01); *G06N 5/02* (2013.01); *G06F 2009/4557* (2013.01); *G06F 2009/45575* (2013.01)

(58) Field of Classification Search
CPC ...... G06F 9/5022; G06F 9/5027; G06F 9/505; G06F 9/5083; G06F 9/5088; G06N 5/00; G06N 5/02
See application file for complete search history.

(56) References Cited

U.S. PATENT DOCUMENTS

| | | | |
|---|---|---|---|
| 10,176,004 B2 | 1/2019 | Gardner et al. | |
| 10,241,814 B2 | 3/2019 | Tsirkin | |
| 10,853,111 B1* | 12/2020 | Gupta | G06F 8/65 |
| 2014/0173623 A1* | 6/2014 | Chang | G06F 9/5094 |
| | | | 718/105 |
| 2014/0317625 A1* | 10/2014 | Ichikawa | G06F 9/45533 |
| | | | 718/1 |
| 2015/0160972 A1* | 6/2015 | Yu | G06F 9/4856 |
| | | | 718/1 |
| 2015/0178124 A1* | 6/2015 | Modani | G06F 9/4881 |
| | | | 718/102 |
| 2016/0307145 A1* | 10/2016 | Banerjee | G06Q 10/063116 |
| 2017/0315838 A1* | 11/2017 | Nidugala | H04L 67/1095 |
| 2017/0364387 A1* | 12/2017 | Ahmed | G06F 3/0664 |
| 2019/0208005 A1* | 7/2019 | Gadalin | H04L 67/10 |
| 2019/0286475 A1* | 9/2019 | Mani | G06F 9/45558 |

* cited by examiner

US 11,301,307 B2

PREDICTIVE ANALYSIS FOR MIGRATION SCHEDULERS

FIELD OF DISCLOSURE

The present disclosure generally relates to data processing, and more particularly to data migration.

BACKGROUND

Virtualization is technology that allows multiple simulated environments or dedicated resources to be created from a single, physical hardware system. Software called a hypervisor connects directly to that hardware and allows a system to be split into separate, distinct, and secure environments known as virtual machines (VMs). These VMs rely on the hypervisor's ability to separate the machine's resources from the hardware and distribute them appropriately.

The physical hardware, equipped with a hypervisor, is called the host, while the many VMs that use its resources are guests. These guests treat computing resources—like CPU, memory, and storage—as a pool of resources that can easily be relocated. Operators can control virtual instances of CPU, memory, storage, and other resources, so guests receive the resources they need when they need them.

SUMMARY

A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a non-transitory memory, and one or more hardware processors coupled to the non-transitory memory to execute instructions from the non-transitory memory to perform operations including: selecting, based on an analysis of a first process launching, scheduled to execute, or executing on a first host, at least one of a plurality of other hosts to which to migrate the first process, the selecting being further based on an analysis of a second process launching, scheduled to execute, or executing on at least one of the plurality of other hosts; predicting, using a predictive analysis technique, an amount of time to complete migrating the first process to the selected at least one of the plurality of other hosts and an end time of the second process, wherein the predicting includes analyzing historical data; determining, based on the predicted amount of time to complete migrating the first process, that the migration of the first process will be completed as soon as or after the second process ends; in response to the determining, scheduling a migration time at which to migrate the first process; performing, at the scheduled migration time, the migration of the first process from the first host to the selected at least one of the plurality of other hosts. Other examples of this aspect include corresponding computer systems, apparatus, and computer programs recorded on one or more computer storage devices, each configured to perform the actions of the methods.

One general aspect includes a method including: selecting, based on an analysis of a first process launching, scheduled to execute, or executing on a first host, at least one of a plurality of other hosts to which to migrate the first process, the selecting being further based on an analysis of the plurality of the other hosts and an analysis of a second process launching, executing, or scheduled to execute on at least one of the plurality of the other hosts; predicting, using at least one predictive analysis technique, an amount of time to complete migrating the first process to the selected at least one of the plurality of other hosts and an end time of the second process; in response to determining that a current time incremented by the predicted amount of time to complete migrating the first process is later than or equal to the predicted end time of the second process, scheduling a migration time at which to migrate the first process from the first host to the selected at least one of the plurality of other hosts; and performing, at the scheduled migration time, the migration of the first process from the first host to the selected at least one of the plurality of other hosts. Other examples of this aspect include corresponding computer systems, apparatus, and computer programs recorded on one or more computer storage devices, each configured to perform the actions of the methods.

One general aspect includes a non-transitory machine-readable medium having stored thereon machine-readable instructions executable to cause at least one machine to perform operations including: predicting a migration duration of a first process launching, scheduled to execute, or executing on a first host and a completion time of a second process launching, scheduled to execute, or executing on a second host, wherein the predicting includes applying a predictive analysis technique to historical data corresponding to prior process migrations; in response to determining, based on the predicted migration duration, that a time at which the migration of the first process will be completed is later than or equal to the predicted completion time of the second process, scheduling the migration of the first process at a migration time; and migrating, at the scheduled migration time, the first process from the first host to the second host. Other examples of this aspect include corresponding computer systems, apparatus, and computer programs recorded on one or more computer storage devices, each configured to perform the actions of the methods.

DETAILED DESCRIPTION

Figure 1:
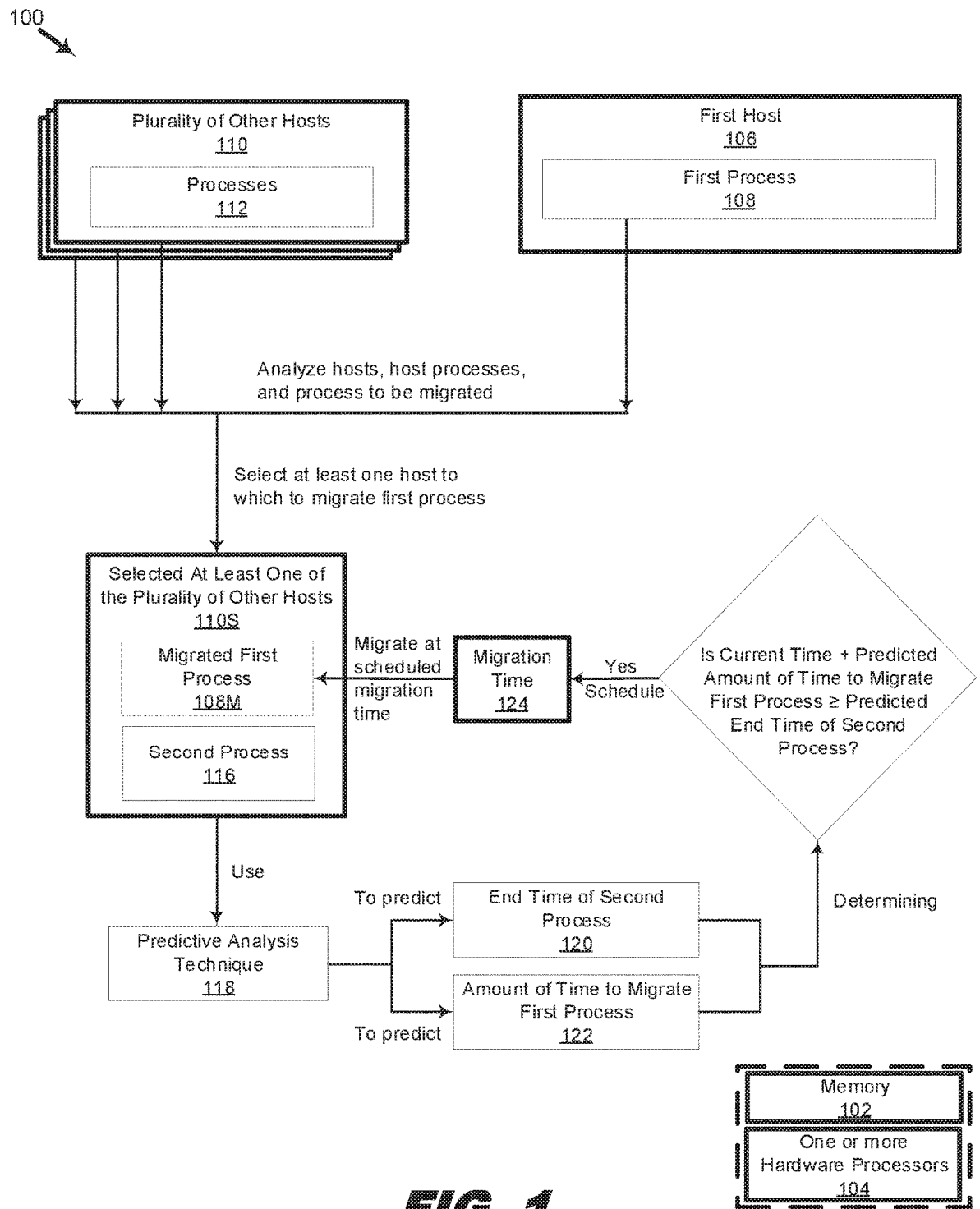
FIG. 1 is an organizational diagram illustrating a system for using predictive analysis techniques to schedule a migration of a process.

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Migration describes the process of moving a guest process (e.g., a virtual machine, a container image, a package, or any other form of an executable process) from one host physical machine to another. This is possible because guest processes (e.g., virtual machines) are running in a virtualized environment instead of directly on the hardware. Migration may be useful in many scenarios. For example, migration may be used for load balancing. In load balancing, guest processes (e.g., virtual machines) are moved to host physical machines with lower usage when their host physical machine becomes overloaded, or another host physical machine is under-utilized. Migration may also be used to achieve hardware independence. For example, when upgrading, adding, or removing hardware devices on the host physical machine, guest processes (e.g., virtual machines) may be safely relocated to other host physical machines. This means that guest processes (e.g., virtual machines) do not experience any downtime for hardware improvements. Further, migration may be used to achieve energy saving by redistributing guest processes (e.g., virtual machines) to other host physical machines and consolidating them at fewer host physical machines so that more host physical machines can remain powered off to save energy and cut costs, such as operating costs, in low usage periods. Migration may additionally be used to achieve network performance improvements, such as by moving guest virtual machines to other geographic locations to lower latency or provide improved access.

Migration works by sending the state of the guest process' (e.g., virtual machine's) memory and any virtualized devices to a destination host physical machine. In some examples, migration uses shared, networked storage to store the guest process' (e.g., virtual machine's) images that are to be migrated. In some examples, such networked storage pools are further managed by software which provide a single way to manage virtual machines and other virtualization functionality, such as storage and network interface management. In some examples, such software manages multiple different virtualization providers/hypervisors when migrating processes (e.g., virtual machines). For example, such software can be used to list the existing processes (e.g., virtual machines) for any supported process manager, virtualization provider, or hypervisor (KVM, Xen, VMWare ESX, etc.), without requiring a user to learn the specific tools or commands of each hypervisor.

Migrations can be performed "live." In a live migration, the guest process (e.g., virtual machine) continues to run on the source host physicalmachine while its memory pages are transferred, in order, to the destination host physical machine. During migration, a process manager (e.g., hypervisor) monitors the source for any changes in pages it has already transferred, and begins to transfer these changes when all of the initial pages have been transferred. The process manager (e.g., hypervisor) also estimates transfer speed during migration, so when the remaining amount of data to transfer will take a certain configurable period of time (for example, 10 milliseconds), the process manager (e.g., hypervisor) suspends the original guest process (e.g., virtual machine), transfers the remaining data, and resumes the same guest process (e.g., virtual machine) on the destination host physical machine. If the original guest process (e.g., virtual machine) modifies pages faster than the process manager (e.g., hypervisor) can transfer them to the destination host physical machine, offline migration must be used, as live migration would never complete.

A migration that is not performed live suspends the guest process (e.g., virtual machine) before moving an image of the guest process' (e.g., virtual machine's) memory to the destination host physical machine. The guest process (e.g., virtual machine) is later resumed on the destination host physical machine and the memory the guest process (e.g., virtual machine) used on the source host physical machine is freed. The time it takes to complete such a migration depends on network bandwidth and latency. If the network is experiencing heavy use or low bandwidth, the migration will take much longer.

For a host to be eligible to start a process or accept a migrated process from another host, the host must have enough free memory and CPUs to support the requirements of the guest process being started on or migrated to the host. If multiple hosts are eligible targets, one may be selected based on the load balancing policy for the cluster. For example, if an even distribution policy is in effect, the host with the lowest CPU utilization may be chosen. If a power saving policy is in effect, the host with the lowest CPU utilization between the maximum and minimum service levels may be selected. In some examples, if a host is responsible for managing a storage pool of a cluster, then such a host may be less preferred target host than another equivalent host which is not managing the storage pool. In some examples, the first process started in a cluster (e.g., by migration) will not run on the host managing the storage pool if the storage pool manager role is held by a host in that cluster.

Host eligibility may depend, as alluded to above, on the target host having the minimum required available computing and networking resources to receive the migrated process, such as CPU (computer processing unit), memory, local disk, remote disk, and network resources. CPU resources may refer to processor type, clock speed, cores, threads, CPU cycles, or other indications of computer processing power. For example, a target host CPU running at 3.0 gigahertz with four available CPU cores would be eligible to host a process requiring a minimum clock speed of 1.8 gigahertz, and a maximum of two cores or a minimum of one core, Memory resources may refer to an amount of available free memory, memory access time, memory timing, or other indications of memory performance, usage or availability. For example, a target host with 16 gigabytes of free memory would be eligible to host a process requiring a recommended 4 gigabytes of free memory, with maximum and minimum memory usage (e.g., based on historical measurements) between 8 gigabytes and 0.5 gigabytes of free memory. Local disk may refer to an amount of local disk space available, input/output operations per second (IOPS), local disk access time, local disk seek time, or other indications of local disk availability, performance, or usage. For example, a target host with 1 terabyte of local disk space would be eligible to host a process requiring 12$ megabytes of disk space. Remote disk may refer to an amount of available network or cloud storage, input/output operations per second (IOPS), remote disk access time, remote disk seek time, remote disk latency, or other indications of remote disk availability, performance, or usage. For example, a target host with 100 terabytes of network or cloud storage would be eligible to host a process requiring 1 terabyte of disk space. Network resources may refer to a network connection type, bandwidth, average path distance, latency, or other indications of network availability or usage. For example, a target host with a T5 connection, offering 400 megabits per second (Mbps) of bandwidth, located 5 hops from the source host, and having 3 milliseconds of latency, would be eligible to host a process requiring a minimum of a T1 connection, 1.5 Mbps bandwidth, an average path distance of 10 hops, and 100 milliseconds of latency. Other parameters and qualifiers (other than minimum, average, maximum) may also be used to determine if a host is eligible to host a process. In some examples, eligibility may be determined based on passing or failing the requirements of a single parameter or a plurality of parameters (e.g., a filter). In some examples, eligibility may be determined based on a totality of parameters, such that even if the requirements of one or more parameters are not met, but other parameters are met or exceeded, the net result may be an eligible host (e.g., a net score).

Processes may be migrated to eligible hosts according to their migration score or migration priority. One factor that may affect the migration score or priority is the criticality of a process, which may be measured using a criticality score. For example, processes identified as mission critical may be prioritized, followed by those identified as high priority, medium priority, low priority, and so forth. Accordingly, higher priority processes may receive better criticality scores than lower priority processes. A better score is a score that makes a process more likely for a process to be migrated. Another factor that may affect the migration priority is the type of process, which may be measured using a type score. For example, a process with many dependencies may have less migration predictability, since the amount of time or resources required to migrate the process may also depend on the amount of time or resources required to migrate each dependency as well. In some examples, a process with no dependencies is classified as a Type 0 process. In some examples, a process with data dependency is classified as Type 1, while a process with other types of dependencies is classified as Type 2. Accordingly, Type 0 processes may receive a better type score than Type 1 processes, which may receive a better type score than Type 2 processes.

In some examples, the dependencies may be analyzed to determine their effect on migration time of a process. For instance, the presence of dependencies may increase or decrease the migration time of a process by some absolute or proportional amount of time as compared to a comparable process having no dependencies. Thus, a process having a Type 1 dependency may take, for example, five minutes longer or 5% longer to migrate than a comparable process having no dependencies, while a Type 2 dependency may take, for example, ten minutes or 10% longer to migrate than a comparable process having no dependencies, or five minutes or 5% longer to migrate than a comparable process having Type 1 dependencies. The absolute or relative amount of time associated with each type of dependency (and any sub-types within each type) may be determined using classification techniques as described herein. In some examples, such classification techniques are performed using machine learning functions as described herein. In some examples, the type score may be used to sort or order processes which, after compensating or normalizing for the amount of migration time based on dependency type, most closely falls within a migration window. For example, a process which after type compensation (still) falls within a migration window, and which predicted amount of time to migrate (after such compensation) is closest to the current time, may receive the best type score; while processes which fall outside such migration window, and which predicted amount of time to migrate (after such compensation) is farthest from the current time, may receive the worst type score. In some examples, the best type score is the highest score, while the worst type score is the lowest score. In some examples, the best type score is the lowest score, while worst type score is the highest score.

Another factor that may determine a process's migration score is the location of the process to be migrated in relation to a target host. All else being equal, the migration of processes from a source host to an eligible target host that is in the same host location as the source host may be prioritized over a similar migration to target hosts in a different host location. If no eligible target hosts in the same host location as the source host exist, then eligible target host in the same data center location as the source host may be prioritized, and if none, then an eligible target host in the same cluster location may be prioritized. For example, if the source host is located in Raleigh, N.C., is part of the North Carolina data center, and belongs to the Southern cluster, then target hosts located in the same host location (e.g., Raleigh) may receive a better score than target hosts located elsewhere (e.g., Charlotte) in the North Carolina, data center, and target hosts in the North Carolina data center may receive a better score than target hosts located elsewhere (e.g., South Carolina) in the Southern cluster. While the locations here are described physically (geographically), locations may also be described virtually by using network identifiers and addresses, such as IP addresses, domains, subnets, etc. In some examples, the overall migration score may be determined by summing each sub-score, e.g., the criticality score, type score, and location score. Other parameters and scoring systems may be used to determine an overall migration score. In some examples, the best migration score has the highest migration priority.

Having determined eligible target hosts and a priority with which to migrate the processes, the time at which to begin migrating the processes remains to be determined. In some examples, processes are migrated according to a preset migration schedule. The migration schedule may or may not be ordered according to migration priority, and may include migration "windows" with start times and/or end times associated with one or more of the processes to be migrated. For example, guest process 1 may be scheduled for a 05:08 a.m. live migration to target host 3, while guest process 2 may be scheduled for a 10:09 a.m. live migration to the same target host 3 following the completion of guest process 1's migration. In some examples, the migration of a process may be completed earlier than scheduled (e.g., 09:10 a.m. instead of 10:09 a.m.). Yet, the migration of the subsequent process may still continue at the originally scheduled time (e.g., 10:09 a.m.), even though it may have been possible to schedule the migration subsequent process at an earlier time to take advantage of the early completion of the previous process. As a result, target host 3 is left to idle for a period of time, leading to inefficiency and a waste of data center resources. Thus, in general, preset migration schedules may be inefficient.

In some examples, a message or some other trigger is used to improve the efficiency of the preset migration schedule by notifying the migration scheduler that a previous process at the target host has completed. In response, the migration scheduler may begin migrating the process from the source host to the destination host. While such notification reduces the amount of idle time, there would still be a not-insignificant amount of idle time due to the several pre-migration steps (that are nevertheless part of the live migration process) that need to be performed after such a notification is received, such as the reservation of resources at the target host to guarantee the availability of the required resources, loading or caching the data to be migrated into memory or the software used for the data migration, checking source deployment type, checking network configuration and operation, or performing any other pre-migration processes prior to copying some portion of the source host's memory to the target host.

To improve the efficiency of the migration, it is desirable to develop techniques that further reduce idle time. For example, as further explained with respect to FIGS. 1-4 below, predictive analysis techniques may be applied to predict when a migration of a process will be completed and when processes executing on a target host will end. For example, if a process P1 that is launching, scheduled to execute, or currently executing on a source host is predicted to take 5 minutes to migrate, and a process P2 that is launching, scheduled to execute, or executing on a target host is predicted to end at 9.30 a.m., then to minimize idle time, process P1 may begin its migration in advance of the predicted end time (e.g., 5 minutes in advance, since the predicted migration time in this example is 5 minutes) such that the migration of process P1 is completed at or after the predicted end time of process P2 (i.e., 9.30 a.m). By contrast, without the use of the predictive techniques, the migration of P1 may begin, for example, at 9.30 a.m. upon notification that P2 has completed, and complete at 9.35 a.m. Thus, without the use of the predictive techniques, the target host would have been idle or inefficiently utilized for up to 5 minutes. In some examples, as a result of predictive techniques, the migrating process P1 also begins executing on the target host at or after the predicted end time of the process P2.

In some examples, the predictions are based on past performance of the same or similar processes as the process that is executing on the source host and is being migrated from the source host to the target host, and the processes that are executing on the target hosts. In some examples, the predictions are based on past performance of the same or similar processes as the process that is scheduled to be executed on the source host or the target host. The predictions may be based on the application of predictive analysis techniques to historical data corresponding to the same or similar such processes. As explained above, such predictions may facilitate the complete migration of a process as soon as possible after the processes that are occupying resources on the target host complete their use of the resources or otherwise release their use of the resources. In some examples, such predictions may also facilitate a partial migration, in which parts of a process are prepared to be migrated or actually migrated based on an amount of resources required by the migrating process or part thereof and the predicted availability of resources of the target host. In some examples, the predicted availability of resources includes a time at which the resources will be available and in what amount. Thus, the idle time that would otherwise have been incurred waiting for resources to be released may also be eliminated or reduced. Moreover, energy usage may be optimized based on such predictions. For example, a host may be powered down to save energy when not needed, and powered up just before it is needed according to predicted completion times of processes launching, executing, or scheduled to be executed on the host and a predicted amount of time for a process to be migrated to the host.

FIG. 1 is an organizational diagram illustrating a system for using predictive analysis techniques to schedule a migration of a process, in accordance with various examples of the present disclosure. The system 100 includes a non-transitory memory 102 and one or more hardware processors 104 coupled to the non-transitory memory 102. In the present example, the one or more hardware processors 104 executes instructions from the non-transitory memory 102 to perform operations for: selecting, based on an analysis of a first process 108 launching, scheduled to execute or executing on a first host 106, at least one of a plurality of other hosts 110 to which to migrate the first process 108, the selecting being further based on an analysis of the plurality of the other hosts 110 and an analysis of a second process 116 launching, executing or scheduled to execute on at least one of the plurality of the other hosts 110; predicting, using at least one predictive analysis technique 118, an amount of time 122 to complete migrating the first process 108 to the selected at least one of the plurality of other hosts 110S and an end time 120 of the second process; in response to determining that a current time incremented by the predicted amount of time 122 to complete migrating the first process 108 is later than or equal to the predicted end time 120 of the second process 116, scheduling a migration time 124 at which to migrate the first process 108 from the first host 106 to the selected at least one of the plurality of other hosts 110S; and performing, at the scheduled migration time 124, the migration of the first process 108 from the first host to the selected at least one of the plurality of other hosts. System 100 may also include additional elements, such as those described with respect to FIGS. 3 and 4, and may be used in conjunction with method 200 described with respect to FIG. 2.

Each of the one or more hardware processors 104 is structured to include one or more general-purpose processing devices such as a microprocessor, central processing unit (CPU), and the like. More particularly, a processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, each processor is structured to include one or more special-purpose processing devices such as an application specific integrated circuit (ASIC), a field programmable gate array (FPGA), a digital signal processor (DSP), network processor, and so forth. The one or more processors execute instructions for performing the operations, steps, and actions discussed herein.

A non-transitory memory 102 is structured to include at least one non-transitory machine-readable medium on which is stored one or more sets of instructions (e.g., software) including any one or more of the methodologies or functions described herein. The non-transitory memory may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read). Accordingly, any of the operations, steps, and actions of the methods described herein may be implemented using corresponding machine-readable instructions stored on or in a memory that are executable by a processor.

The system 100 includes a bus or other communication mechanism for communicating information data, signals, and information between the non-transitory memory 102, the one or more hardware processors 104, and the various components of system 100. For example, the various components may include a data storage device, which may be local to the system 100 or communicatively coupled to the system 100 via a network interface. Components may further include input/output (I/O) components such as a keyboard, mouse, touch interface, and/or camera that process (es) user actions such as key presses, clicks, taps, and/or gestures and sends a corresponding signal to the bus or other communication mechanism. The I/O component may also include an output component such as a display.

In some examples, a user may use the I/O component to command the system 100, via a user interface such as a graphical user interface, a command line interface, or any other interface a user may use to communicate with system 100, to directly or indirectly cause the first process 108 to be migrated to the selected at least one of the plurality of other hosts 110S. In some examples, the first process 108 is migrated to the selected at least one of the plurality of other hosts 110S without explicit user intervention, for example, based on instructions stored in non-transitory memory 102. In some examples, the instructions to analyze one or more of the first host 106, the first process 108, the plurality of other hosts 110, and processes 112 launching, executing on, or scheduled to execute on the plurality of other hosts 110, may be stored in an analyzer module comprised of non-transitory memory 102 and one or more hardware processors 104, or a non-transitory memory and one or more hardware processors that is the same as or similar to non-transitory memory 102 and one or more hardware processors 104. Such instructions may be included in a migration software or any other software. In some examples, the analyzer module executes locally on the system 100. In some examples, the analyzer module executes remotely and is accessible to the system 100 via a network interface. In some examples, the analyzer module executes in a cloud network. In some examples, the system 100 is a cloud-based migration manager, which is used to manage and migrate cloud-based processes or virtual machines executing in a host in one part of the cloud to a host in another part of the cloud. Thus, in some examples, a user may use I/O component to interact with the system 100 across a network.

The system 100 may be used to migrate a process (e.g., virtual machine, a container image, a package, or any other form of an executable process), such as first process 108, that is launching, executing, or scheduled to execute on a host, such as first host 106, to any of a plurality of other hosts 110. In some examples, a process may be migrated to a single one of the plurality of other hosts 110. In other examples, a process may be migrated to more than one other host in the plurality of other hosts 110. Such migration to multiple hosts may be for back-up or redundancy purposes or for increasing performance of the process, for example, by configuring the migrated processes in an appropriate redundant array independent disk (RAID) configuration, such as RAID 0, RAID 1, RAID 5, RAID 10, or any other configuration that takes advantage of multiple instances of computer hardware (e.g., CPU, memory, storage, networking, etc.).

Prior to the migration of the first process 108, the system 100 may analyze the first host 106, first process 108, plurality of other hosts 110, or processes 112, to select at least one host 110S among the plurality of other hosts 110 to which to migrate the first process 108. As will be further described with respect to FIG. 4, such analysis may include an analysis of, for example, the resource requirements of the first process 108 and the available resources of the plurality of other hosts 110. Thus, the analysis may filter out eligible hosts from ineligible hosts based on resource requirements or other analytical parameters. At the time of analysis, it may also be determined that the selected at least one host 110S is running one or more processes or is scheduled to run one or more processes in the future, such as second process 116. In some examples, the migration of the first process 108 may be scheduled to start after the completion or termination of the second process 116, i.e., in some examples, the next process that is queued to start after the second process 116 may be first process 108. In some examples, based on an amount of time 122 to complete migrating the first process 108 to the selected at least one host 110S, and the end time 120 of the second process 116, the migration of the first process 108 may begin prior to the completion or termination of the second process 116.

As previously explained, idle time may be minimized if, for example, the migration of the first process 108 is completed at or after the time at which the second process 116 ends. Thus, any pre-migration activities may be initiated and completed prior to the end time 120 of the second process 116, such that the portions of non-transitory memory 102 corresponding to the first process 108 may be copied to the selected at least one host 110S as early as possible (and as available resources permit). To minimize idle time, all such copying should be completed at or as soon as possible after the end time 120 of the second process 116. In some examples concurrent copying may be performed in which portions of memory corresponding to the first process 108 are copied to the selected at least one host 110S without pausing or terminating the second process 116. Such concurrent or live migration may still benefit from the techniques disclosed herein because all such activities that do not require pausing or interrupting the second process 116 may be completed at or after the end time 120 of the second process 116, leaving only the activities that do require pausing or interruption of the second process 116 to be performed at or after the end time 120 of the second process 116.

Figure 3:
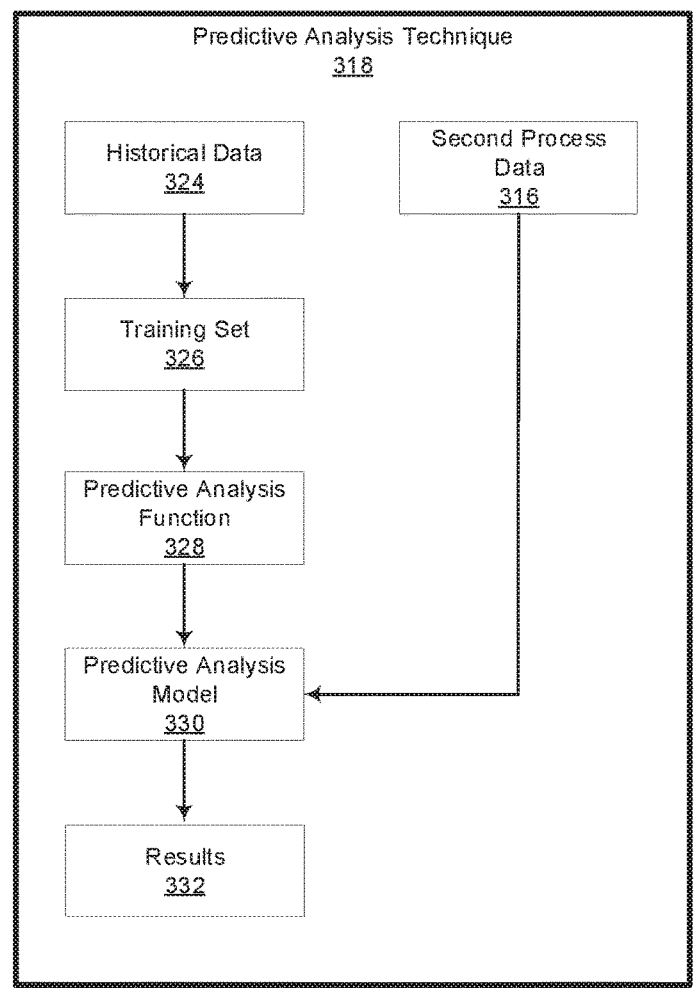
FIG. 3 is an organizational diagram illustrating a system for generating results using a predictive analysis technique.
Figure 3:
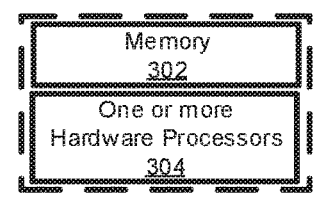

Predictive analysis techniques 118, such as those described with respect to FIG. 3, may be used to predict the end time 120 of the second process 116 and the amount of time 122 to migrate the first process 108. In some examples, the amount of time 122 to migrate the first process 108 may be the amount of time to completely migrate the first process 108. In some examples, the amount of time 122 to migrate the first process 108 may be the amount of time to migrate the part of the first process 108 that can be concurrently migrated. If the current time incremented by the predicted amount of time 122 to migrate the first process 108 is later than or equal to the predicted end time 120 of the second process 116, then a migration time 124 is scheduled.

For example, if the current time is 9.25 a.m., and the predicted amount of time 122 to migrate the first process 108 is five minutes, then the current time incremented by the predicted amount of time 122 to migrate the first process 108 is 9.30 a.m (9.25 a.m. incremented by five minutes). If the end time 120 of the second process 116 is predicted to be 9.30 a.m. or earlier, then a migration time 124 may be scheduled to migrate the first process 108 to the selected at least one host 110S, since based on the predictions, idle time will be minimized as the first process 108 will be migrated to the selected at least one host 110S as soon as or after the second process 116 ends. In some examples, if the end time 120 of the second process 116 (e.g., 9.35 a.m.) is predicted to be later than the current time incremented by the predicted amount of time 122 to migrate the first process 108 (e.g., 9.30 a.m.), then a migration time is not scheduled. In some examples, the migration time 124 may not be scheduled unless there is some sufficient or threshold amount of remaining execution time of the first process 108 after the migration, such that the resources saved by executing the first process 108 on the selected at least one host 110S for the duration of the remaining time of the first process 108 outweigh the resources spent in migrating the first process 108 to the selected at least one host 110S. Such threshold may be absolute (e.g., a quantity of CPU, memory, storage, network, or other resources) or relative (e.g., a percentage or fraction of the same).

In some examples, the scheduled migration time 124 may be dependent upon other factors, such as a trigger based on the second process 116. In some examples, the trigger may be a certain completion percentage of the second process 116, which may be time-based or task-based. For example, if the second process 116 is predicted to run for a further 100 minutes from the current time, time-based triggers may be set at earlier times prior to the actual or predicted completion of the second process 116, such as at 40, 60, and 80 minutes. In some examples, upon reaching a completion percentage, e.g., 40%, 60%, or 80%, of the remaining run time or predicted completion time 120 of the second process 116, or upon completion of a phase or a task in the running of the second process 116, the migration may be commenced or a migration activity (which includes pre-migration activities) may be performed. Such milestones may be used to provide greater certainty that the migration progress or resource usage of the first process 108 as it is being migrated is synchronized with the completion progress or resource usage of the second process 116, and will be as completely migrated as possible by the end time 120 of the second process 116. Accordingly, the scheduled migration time 124 may be further advanced or retarded based on such triggers or milestones.

At the scheduled migration time 124, the first process 108 may be migrated to the selected at least one host 110S of the plurality of other hosts 110. Such first process 108 that has been migrated to the selected at least one host 110S may be referred to as migrated first process 108M. Migration may include launching the migrated first process 108M, executing the first process 108M, or scheduling the first process 108M to be launched or executed. In some examples, migration may also include the unscheduled launching, scheduled launching, scheduled migration, or unscheduled migration of a process, such as first process 108 or first process 108M. In some examples, first process 108 may be cloned for redundancy or performance reasons. Such clones may be stored or execute on the same source host, first host 106, or on different hosts such as any one or more of the plurality of the other hosts 110. In some examples, migration of the first process 108 also entails migration of any clones of the first process 108 to the same or different destination host or hosts, such as the selected at least one host 110S or to another suitable host.

Migration may be performed according to pre-copy memory or post-copy memory migration techniques. In pre-copy migration, a hypervisor executing on system 100 may copy memory pages from first host 106 to the selected at least one host 110S while the first process 108 is still executing on the first host 106. Memory pages that are changed (dirtied) during this process may be re-copied until the rate of re-copied pages is greater than the page dirtying rate. The dirty pages are copied over from the first process 108 to the at least one host 110S by momentarily pausing the first process 108 at the first host 106.

In post-copy memory migration, the execution state of the first process 108, such as the CPU state, registers, and non-pageable memory is transferred to the selected at least one host 110S while the first process 108 is paused. Instead of sending multiple copies of dirty pages until the rate of re-copying exceeds the rate of dirtying, in post-copy memory migration, the remaining (pageable) memory pages are sent just once by the first host 106 to the selected at least one host 110S on demand. While post-copy conserves network resources, performance-degrading page faults may be generated if the migrated first process 108M attempts to access a page that has not yet been transferred. Such page faults may be reduced by pre-emptively transferring pages that are in the vicinity of the requested page (e.g., prepaging), as such pages are likely to also be requested in the future. In post-copy memory migration, the state of the migrated first process 108M is distributed across both the first host 106 and the selected at least one host 110S until all pages are completely sent across, whereas in pre-copy memory migration, the state of the migrated first process 108M is replicated on the selected at least one host 110S, such that if the selected at least one host 110S fails, pre-copy can recover the first process 108, whereas post-copy cannot.

Figure 2:
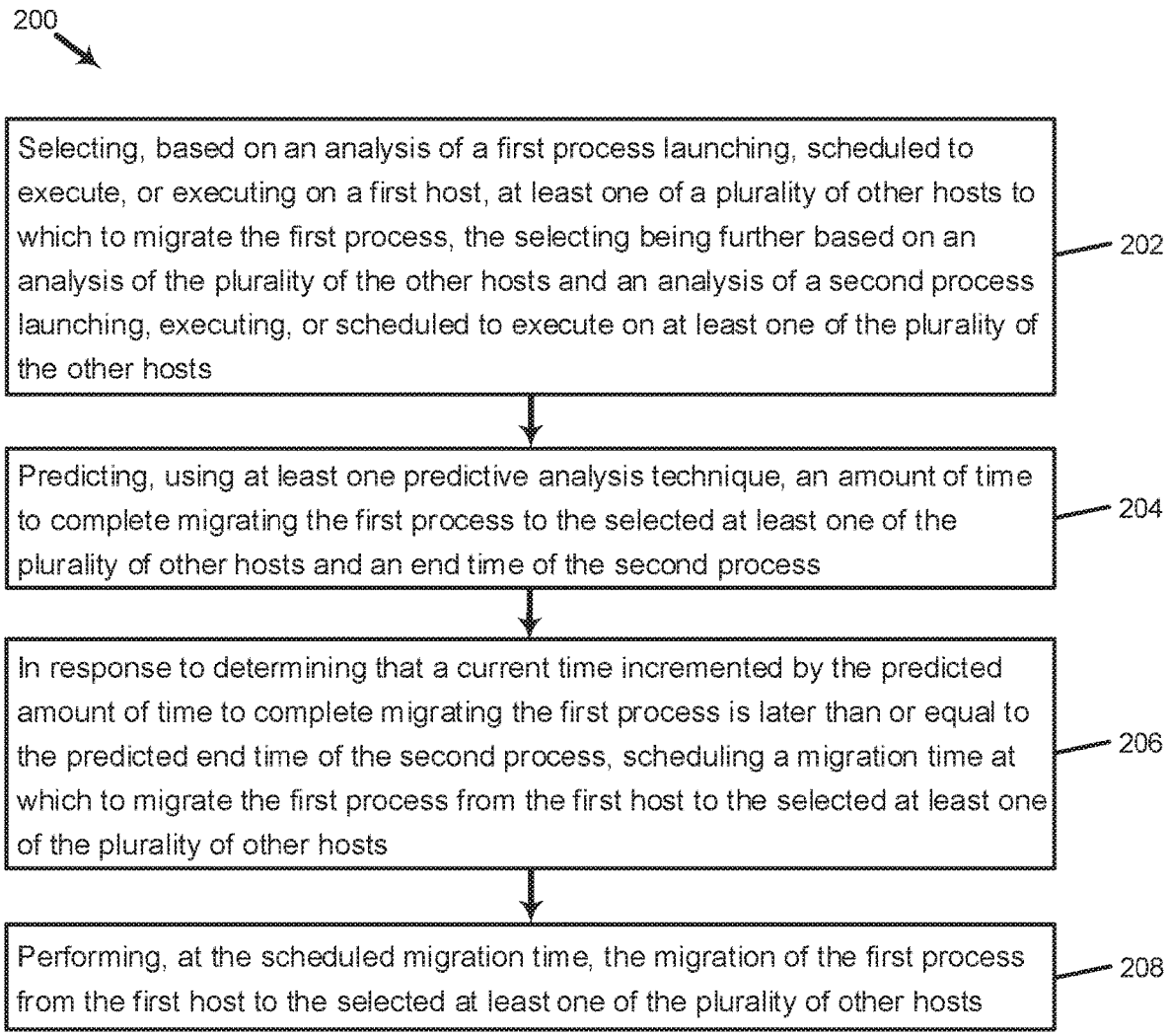
FIG. 2 is a flow diagram illustrating a method for using predictive analysis techniques to schedule a migration of a process.

FIG. 2 is a flow diagram illustrating a method for using predictive analysis techniques to schedule a migration of a process, in accordance with various examples of the present disclosure. The method 200 may be performed by non-transitory memory and processors provided, for example, by the system 100 described with respect to FIG. 1. Additional steps may be provided before, during, and after the steps of method 200, and some of the steps described may be replaced, eliminated and/or re-ordered for other examples of the method 200. Method 200 may also include additional steps and elements, such as those described with respect to FIGS. 1, 3 and 4. In some examples, method 200 may be performed by one or more computer systems 100 described with respect to FIG. 1, acting in concert such as in a distributed or cloud computing network or individually such as on a single server or workstation.

At action 202, at least one destination host to which to migrate a process is selected. The migrating process may currently be launching, executing, or scheduled to execute on a source host. In some examples, the selection may be based on an analysis of the resource requirements, resource consumption, operating system requirements, hardware specification requirements, location, or any other requirement or usage pattern of the migrating process or of any process executing or scheduled to be executed on the destination host. Just as the migrating process may be launching, currently executing or scheduled for execution on the source host, other processes may also be launching, currently executing on or be scheduled for future execution on the destination host. Thus, the selection may further be based on an analysis of the destination host and a process presently launching, executing, or scheduled to be executed on the destination host. Such analysis may include an analysis of resource availability, process start time, process end time, hardware specifications, network path length, host location, data center location, cluster location, or any other availability, specification or characteristic of the destination host itself, or of any process launching, executing, or scheduled to be executed on the destination host. The selection may also be based on earliest destination host availability. Thus, if multiple destination hosts have the required resource availability, the destination hosts which have the earliest availability may be prioritized. If there is a specific time at which the migrating process must be migrated, e.g., to suit a larger migration schedule, then only the hosts that are eligible per the analysis and available at such specific time may be selected.

In some examples, predictive analysis techniques such as those described at action 204 are used to analyze and predict the resource requirements, resource consumption, operating system requirements, hardware specification requirements, location, or any other requirement or usage pattern of the migrating process or of any process launching, executing, or scheduled to be executed on the destination host. In some examples, predictive analysis techniques such as those described at action 204 are used to analyze the and predict the resource availability, process start time, process end time, hardware specifications, network path length, host location, data center location, cluster location, or any other availability, specification or characteristic of the destination host itself, or of any process launching, executing, or scheduled to be executed on the destination host.

At action 204, predictive analysis techniques are used to predict an amount of time to migrate the process from the source host to a destination host and an end time of a process executing on the destination host. In some examples, the predicted amount of time to migrate the process refers to the predicted amount of time to completely migrate the process. In some examples, the predicted amount of time refers to the predicted amount of time to migrate the process to the extent that the process can be migrated live or concurrently (i.e., without pausing the process executing on the destination host or waiting for the process executing on the destination host to end). In some examples, the predictive analysis techniques described with respect to FIG. 3 are used to predict the amount of time to migrate the process and the end time of process executing on the destination host. In some examples, the predictive analysis techniques are applied to historical data to generate the predictions.

Historical data may include any data prior to the time at which a relevant action, such as action 202 or action 204, is taken. For example, if the instruction to predict an end time of a process executing on a destination host is received at 9.20 a.m., then the historical data used for that prediction may include any data prior to 9.20 a.m. Historical data may also include any data prior to the performance of any part of a migration process, which may include pre-migration activities. Historical data may include data about previous migrations, such as: process start time; process end time; migration start time; migration end time; pause start time; pause end time; time per iteration; iteration migration start time; iteration migration end time; number of iterations; source location; destination location; scoring; memory transfer start time; memory transfer end time; total transfer size; initial transfer size; indication of migration success or failure; failure code or reason; CPU usage; remote disk usage; local disk usage; memory usage; and network usage. Historical data may be: stored on the system, such as system 100 described with respect to FIG. 1; stored in a single locally-accessible or remotely-accessible data store; stored across multiple locally- or remotely-accessible data stores; be distributed in a cloud, on fixed or portable storage media; or be stored in any other form, or at any other location or in any form that is accessible by system 100.

The historical data may include process start and end times. The process start and end times may include the times at which a process executing, running, or operating on a host starts and ends, or the times at which a host begins or stops hosting a process. Process start and end times may be used to predict for how long a similar process is likely to run.

The historical data may include migration start and end times. Migration start and end times may include the respective times at which migration of a process executing, running, or operating on a host starts and ends, or the respective times at which a host begins or stops receiving a migrating process. Migration start and end times may include pre-migration start and end times, memory transfer start and end times, and pause start and end times. Historical migration start and end times may be used to predict how long it would take a process that is similar to the historical processes corresponding to the historical migration start and end times to migrate. Such prediction may involve the application of predictive analysis techniques, such as machine learning and classification, to historical data as further described in FIG. 3. The benefits of predicting migration duration may be seen in the following examples. In some examples, if a migrating process is predicted to take less time to migrate than estimated using ordinary, non-predictive means, then the process may be migrated using an earlier but smaller available time slot than would be possible using non-predictive means. In some examples, if an immigrating process, P1, is awaiting the emigration or end of another process, P2, that is launching, scheduled to execute, or executing on a destination host to begin its (P1's) immigration into the destination host, a shorter predicted emigration duration or an earlier predicted end time of P2 means that P1 may begin and complete its immigration at an earlier time than otherwise possible without such prediction. Further, the resources of the destination host may be released and allocated to P1 as soon as or after P2 has ended or completed its emigration. Such resource allocation may occur sooner than without such prediction, because as just explained, P1 may begin its immigration sooner based on the predicted end time P2, and may therefore also complete its migration sooner. Thus, as a result of predicting migration duration based on migration start and end times, P1 may not only migrate, but also launch, execute, or be scheduled to execute on the destination host sooner than without such prediction.

The historical data may include pre-migration start and end times. Pre-migration start and end times may include the start and end times for any pre-migration activities, such as selecting hosts to which to migrate a process and reserving time slots of such selected hosts. Such pre-migration start and end times may be used to predict how long it would take to prepare a similar process to be migrated.

The historical data may include memory transfer start and end times. In a pre-copy migration process, the memory transfer start time may include the time at which a memory page is sent to a receiving or destination host, while the memory transfer end time may include the time at which the last of the non-dirty pages is sent to the receiving or destination host. In a post-copy migration process, the memory transfer start time may include the time at which the first page is pushed on demand from a source host to a destination host after the transfer of the execution state from the source host to the destination host. The memory transfer start time may include the time at which pre-paging begins. In a post-copy migration process, the memory transfer end time may include the time at which some predetermined amount of the pages or all of the pages of a prepaging process are sent to the destination host, or the time at which a network page fault threshold is reached (e.g., less than 1% network page faults). Such memory transfer start and end times may be used to predict how long it would take to transfer a similar amount of memory without pausing the source host. Thus, predicted memory transfer start and end times may be based on historical memory transfer start and end times, and critical events requiring the source host to be active may be scheduled between predicted memory transfer start and end times. Such predicted memory transfer start and end times may be used to better predict a migration duration.

The historical data may include pause start and end times. The pause start time may include the time at which the source process is paused to transfer dirty pages or the execution state of the migrating process. Pause end time may include the time at which the source process is resumed after transferring all dirty pages or a time at which the execution state of the migrating process is transferred to the receiving host. In a pre-copy migration process, the pause start and end times may include the commencement and ending times of copying dirty pages from the source host to the destination host. In a post-copy migration process, the pause start and end times may include the commencement and ending times to transmit an execution state of a migrating process to a receiving or destination host. Such pause start and end times may be used to better predict the amount of time to migrate a similar amount of dirty pages or similarly-sized execution state from a source host in a similar location as the source host being analyzed to a destination host in a similar location as the destination host being analyzed, in order to better predict the migration duration. By also predicting the pause start and end times, the migration duration may be more accurately predicted. For example, without predicting pause start and end times, a migration may be estimated to take twenty minutes factoring in some average pause time. But based on a predictive analysis of the process to be migrated and the historical data, it may be determined that the process is likely to require a lower amount of pause time based on similar migrations in the past. Thus, the migration duration of the current process may be predicted to take only ten minutes. Since there may be many more hosts that have a ten-minute availability to accept a migrating process as opposed to a twenty-minute window, on a whole, more migrations may proceed within the same amount of time, reducing idle time on average.

During a live migration, pages may become dirty at any time. Thus, pages may be transferred in multiple iterations. For example, in a first iteration, unmodified pages may be sent. In following iterations, less frequently updated pages may be sent. In a final iteration, the most frequently updated pages (i.e., dirty pages) are sent while the process is momentarily paused. The goal of using iterations is to reduce the number of pages that need to be sent in the final iteration, which not only reduces the pause and idle time of the source host, but also ensures almost seamless access to the process by a user.

Thus, the historical data may include a number of iterations, a time per iteration, and iteration migration start and end times. The number of iterations may include the total number of iterations from first to last. The time per iteration may include an amount of time to transfer each iteration of the migrating process. The iteration migration start time may include the time at which the transfer of an iteration to a destination host begins. The iteration migration end time may include the time at which the transfer of an iteration to a destination host ends. The number of iterations, time per iteration, and iteration migration start and end times may be used to better predict the number of iterations required to transfer processes having similar characteristics, and ultimately better predict the completion time for the migration. As explained earlier, accurate predictions of migration durations may lead to increased migration efficiency, reduced idle times, and potential cost-savings.

The historical data may include a transfer size. The transfer size may include a total transfer size and an initial transfer size. The total transfer size may include the sum of the disk space required to transfer all of the iterations. Because multiple iterations may be sent, the total transfer size may exceed the size of the migrating process executing on the source host. The initial transfer size may include the transfer size of an initial iteration, the size of the migrating process (as executing on the source host before iterations), or the size of the executing state of the migrating process. Such initial and total transfer size may be used to predict an amount of network resources and destination host resources, and ultimately the completion time required to migrate a similar process executing on a source host or emigrate a similar process executing on a destination host.

The historical data may include a source location and a destination location. For example, the source location may include the geographic location of the source host from which the migrating process is being transferred. The destination location may include the geographic location of the receiving host to which the migrating process is being transferred. The geographic location may include the location of the host (e.g., Raleigh), the location of the data center (e.g., North Carolina), and the location of the cluster (e.g., North America).

The historical data may include an amount of resources, such as CPU usage, remote disk usage, local disk usage, memory usage, and network usage may be used to predict the completion time of a migrating process. Such parameters may be normalized in a pre-processing step before the parameters are analyzed. Normalization accounts for variations in different types of hardware, software, network conditions, etc., which allows the parameters to be compared on an even basis and increases prediction accuracy. For example, if the resource usage is generally lower than the reference historic values, then the migrating process may not experience resource bottlenecks and will complete as quickly as possible. However, if the resource usage is higher than the reference values in the historical data, then the migration may be delayed. The resource usage values may include an average, maximum, minimum, and other such representative values of resource usage. Remote disk usage may include a location, a network path distance to the remote disk, and bandwidth values of the remote connection to the remote disk. The use of further-located remote disks with lower bandwidth values than in the reference historical data may cause a migration to be delayed, but the use of remote disks with higher bandwidth values than reference may allow a migration to be advanced. Network usage may include network usage as between the source host and destination host, such as the bandwidth of the connection between the source host and the destination host and its path distance. A higher current bandwidth as compared to a corresponding historic bandwidth value may mean that the migration may be completed at a faster rate, and hence the migration schedule may be advanced.

The historical data may include an indication of migration success or failure, and a failure code or the reasons for such failure. Such indications may be important in understanding why some migrations were successful where others were not, and may be used to train a predictive model or a machine learning function to predict completion times that lead to successful migrations.

Finally, based on applying predictive analysis techniques to the historical data, a composite score may be assigned to each migrating process. The score may be captured as part of the historical data, with each parameter contributing a same or different weight to the score. In some examples, higher scores may indicate that a process is more likely to complete or terminate (its execution or migration) within a given timeframe, while lower scores may indicate that a migrating process is less likely to do so. In some examples, scores may indicate a predicted amount of time by which a process will complete or terminate within a given timeframe. For example, scores in a low range may indicate that the migration may complete or terminate ahead of a given timeframe by a small amount of time, while scores in a higher range may indicate that the migration may complete or terminate ahead of a given timeframe by a large amount of time. Thus, the highest scoring processes that are predicted to complete migration within, for example, the next 10 minutes may be matched with the highest scoring processes that are predicted to end in the next 10 minutes or later. In some instances, a mathematical relationship exists between the score and the amount of time in advance. For example, the score may be a fraction of a second, minute, hour, or other measure of time by which a process is predicted to complete or terminate within a given timeframe.

At action 206, in response to determining that a current time incremented by the predicted amount of time to migrate the process is later than or equal to the predicted end time of the process executing on the destination host, a migration time is scheduled at which to migrate the process from the source host to the selected destination host. In some examples, the migration time is scheduled such that: the migration of a first process, such as first process 108, begins while a second process, such as second process 116, is launching, executing or scheduled to execute on the destination host; and/or the migration of the first process completes at or after the predicted or actual end time of the second process launching, executing, or scheduled to execute on the destination host.

For example, if the current time is 9.20 a.m., and the predicted amount of time to migrate the first process is five minutes, then the current time incremented by the predicted amount of time to migrate the process is 9.25 a.m. (9.20 a.m. incremented by five minutes). The end time of the second process launching, scheduled to execute, or executing on the destination host may be 9.33 a.m. In examples where the migration of the first process completes after the predicted or actual end time of the second process, migrating the first process at the current time, i.e., 9.20 a.m., would be too early, as the migration would complete at 9.25 a.m. which is eight minutes before the second process ends. In some examples, an alternative eligible host that is predicted to be available is selected as the new destination host to which to migrate the first process. Such predicted availability may be similarly based on predicted end times of processes launching, scheduled to execute, or executing on such alternative host, and the predicted amount of time to migrate the first process to such alternative eligible host. For example, if the current time incremented by the predicted amount of time to migrate the first process to such alternative host (which predicted amount of time to migrate may be different owing to different resource conditions on the alternative host or between the alternative host and the source host) is at or after the predicted end times of such processes on such alternative hosts, then the first process may begin its migration to such alternative host.

In some examples, if no other eligible host is predicted to be available at the current time, the migration of the first process may be put on hold until an eligible host is predicted to become available. For example, if the host in this example is the only eligible host that is predicted to be available between the current time (9.20 a.m.) and the end time of the second process decremented by the predicted amount of time to migrate the first process (9.28 a.m.), then the migration of the first process will be held for eight minutes. When the current time is 9.28 a.m., which is five minutes (the predicted amount of time to migrate the first process) before 9.33 a.m. (the predicted end time of the second process), the migration of the first process may begin. In other words, when the current time is at or after the predicted end time of the second process decremented by the predicted amount of time for the first (migrating) process to complete its migration, the migration of the first process may begin such that the migration of the first process is predicted to complete or actually completes at the predicted end time of the second process.

Suppose for some reason, such as resource unavailability or any other reason, the migration of the first process does not commence at 9.28 a.m. In other words, the predicted completion time of the migration of the first process would be after the predicted end time of the second process. For example, assume the current time is now 9.30 a.m. Thus, the current time incremented by the predicted amount of time to migrate the first process would be 9.35 a.m. If the end time of the second process launching, scheduled to execute, or executing on the destination host is predicted to be at or before the current time incremented by the predicted amount of time to migrate the process (e.g., the predicted end time 9.33 a.m., which is at or before 9.35 a.m.), then in order to achieve a time savings as compared to beginning the migration only upon completion of the second process at 9.33 a.m., the migration time may be scheduled at any time between the current time and the predicted end time (e.g., between 9.30 a.m. and 9.33 a.m.). Thus, in this example, the migration may begin as early as 9.30 a.m., and as late as 9.33 a.m. In other words, the migration of the first process is predicted to be completed between 9.35 a.m. and 9.38 a.m. As shown by this example, starting the migration at the current time (i.e., 9.30 a.m.) results in a predicted completion of 9.35 a.m. and a maximum savings of 3 minutes in idle time as compared to starting the migration only upon receiving notification that the process has ended at 9.33 a.m., in which case the migration would be expected to complete at the earliest at 9.38 a.m. In some examples, the migrated process is launched, executed, or scheduled to execute as soon as or after the migration is completed but before the predicted end time incremented by the predicted amount of time to migrate the process (i.e., between 9.35 a.m. and 9.38 a.m.).

At action 208, the migration of the process from the source host to the destination host is performed at the scheduled migration time. In some examples, the migration may proceed according to a pre-copy migration technique, while in other examples, the migration may proceed according to a post-copy migration technique. However, any other type of migration techniques may also be used.

FIG. 3 is an organizational diagram illustrating a system 300 for generating results using a predictive analysis technique, in accordance with various examples of the present disclosure. The system 300 includes a non-transitory memory 302 and one or more hardware processors 304 coupled to the non-transitory memory 302, which are similar to those described with respect to FIG. 1. In the present example, the one or more hardware processors 304 executes instructions from the non-transitory memory 302 to perform operations for analyzing, by a machine learning function, the metadata associated with the source code to predict a likelihood of success of the source code. System 300 may also include additional elements, such as those described with respect to FIGS. 1 and 4. Additionally, system 300 may be used in conjunction with method 200 described with respect to FIG. 2.

FIG. 3 shows a predictive analysis technique 318 that uses historical data 324 as a training set 326. This historical data 324 may include the historical data as described earlier. In some examples, historical data 324 includes only historical data corresponding to successfully migrated processes. In some examples, historical data 324 includes historical data corresponding to both successfully and unsuccessfully migrated processes. The training set 326 may be a subset of the historical data 324, or the entire set of historical data 324. The training set 326 is fed to a predictive analysis function 328 to train the predictive analysis function 328, which is part of a predictive analysis model 330. The predictive analysis model 330 may use one or more predictive analysis functions 328 as well as other types of functions to generate results 332. The results 332 may be validated against a subset of the training set 326 which was not used to train the predictive analysis model 330. If the results 332 are within an expected error rate, then the predictive analysis model 330 is validated. In some examples, predictive analysis model 330 accepts actual, non-training set process data for which a prediction is required to be performed, such as data from first process 108, processes 112, or second process 316, after the predictive analysis model 330 is validated.

In some examples, predictive analysis model 330 may use a predictive analysis function 328 based on a regression model. In some examples, predictive analysis model 330 may use a predictive analysis function 328 based on a pattern classifier or classification model. However, predictive analysis model 330 is not limited to regression or classification models, and any other kind of predictive analysis function and any other kind of model may be used. Regression models analyze relationships between variables and trends to predict values for continuous variables. Examples of regression models include linear regression models, logistic regression models, multinomial logistic regression models, probit regression models, logit versus probit models, discrete choice models, time series models, survival or duration analysis models, multivariate adaptive regression splines, k-nearest neighbors regression models, support vector machine regression models, classification and regression trees (CART).

Classification models may use classification techniques such as pattern classifiers to assign discrete class labels to input data to predict an outcome. Examples of classification techniques include k-nearest neighbors, decision tree, radial basis functions, neural networks, multilayer perceptron (MLP), Bayesian or Naïve Bayesian classification, geospatial predictive modeling, or any other type of classification technique.

Pattern classification may be supervised or unsupervised. In supervised learning, the true class of an input is known. For example, based on historical data, the amount of time to migrate a process having a combination of certain characteristics is known. Such amount of time, or indeed any other historical data parameter or combination of historical data parameters, may be used to train the predictive analysis function 328 or machine learning function to classify new unseen processes. Thus, the predictive analysis function 328 may find patterns, using any one of the aforementioned classification techniques, in the historical data set. For example, a class may be defined for a total transfer size of some size (e.g., less than 1 gigabyte), a network bandwidth of some amount (e.g., greater than 400 megabits per second), fewer than some number of iterations (e.g., less than 3), and some amount of pause duration (e.g., less than thirty seconds).

Based on historical data, the processes in the class may historically have taken some amount of time to migrate or to complete their executions (e.g., 23 minutes and 170 minutes respectively), such amounts of time representative of the class at some level of confidence or certainty. Thus, a process may be classified based on the individual parameter cutoffs at each round of classification (e.g., total transfer size less than or equal to, or more than 1 gigabyte; network bandwidth less than or equal to, or more than 400 megabits per second; etc.). Each round of classification may generate one or more classes, and each class may be associated with a predicted amount of time to migrate a process in that class or a predicted amount of time to complete executing a process in that class. Such amounts of time may be an average, minimum, maximum, or other statistically significant amount of time. In this particular example, the combination of parameters used includes total transfer size, network bandwidth, number of iterations, and pause duration to predict both the amount of time to migrate a process and the completion time of the process. However, the same, additional, or different parameters in other combinations and permutations may be used to predict the amount of time to migrate a process and to predict the completion time of the process. The permutation and combination of parameters used to predict the amount of time to migrate a process may be different from the permutation and combination of parameters used to predict the completion time of the process.

As the predictive analysis function 328 is fed more data, the permutation or combination of parameters may change, the cut-off values for each parameter may change, and the times associated with each class may change, as the additional data may be used by the predictive analysis function 328 to more precisely and more clearly create better-defined classes with greater separation from one another. Further, the predictive analysis function 328 may be refined based on feedback from cross-validation of the results 332 of the predictive analysis function 328 against a subset of the historical data not previously fed to the predictive analysis function 328. For example, if the predictive analysis function 328 predicts that a process will complete 23 minutes in advance, but cross-validation against the historical data shows that the process actually completed only 5 minutes in advance, then the error may be determined to be significant according to some predetermined threshold error level, and the predictive analysis function 328 may be retrained or fed more data.

Such a process of feeding data, adjusting, validating, and responding to feedback may be referred to as training the predictive analysis function 328. Eventually, such training may lead to a stable combination of parameters that predicts, with some threshold amount of accuracy, the end time of an executing process and the amount of time it would take to migrate a process. By training the predictive analysis function 328 to make other sorts of predictions based on the same or different combinations of parameters, the predictive analysis function 328 may be used to perform any other desired prediction so as to produce different types of results 332.

Predictive analysis model 330 may also include post-processing. For example, to predict an end time of an executing process, the amount of time taken for a process to complete execution (e.g., 170 minutes) obtained as a result 332 or classification of the predictive analysis function 328 may be added to the start time of the process (e.g., 7 a.m.) to determine that the predicted end time of the executing process is 9.50 a.m. Such a predicted end time which is based on post-processing may also be considered a result 332. Different post-processing methods may be used to generate different results 332.

Additionally, predictive analysis model 330 may use different types of predictive analysis functions 328 to perform different types of prediction or to achieve different purposes. In some examples, predictive analysis function 328 uses statistical methods to calculate a deviation from a mean and eliminates results outside of a threshold deviation. In some examples, predictive analysis function 328 uses signal processing techniques, such as a smoothing filter to eliminate glitches and outliers. In some examples, predictive analysis function 328 uses machine learning to analyze patterns and categorize between normal and out of range results. For example, predictive analysis model 330 may use a predictive analysis function 328 based on support vector machine to predict a category, such as whether a migrating process belongs to a category of processes with an advanced migration time, or to a category of processes without an advanced migration time. Predictive analysis model 330 may also use predictive analysis function 328 based on artificial neural networks to generate results 332 to predict a failure and a time of failure of a process or of a host, for example, based on runtime, resource usage intensity, resource usage patterns, or other historic data.

In some examples, predictive analysis model 330 may use predictive analysis functions 328 to monitor hosts and processes within its network or that it is otherwise aware of or in communication with, so as to identify opportunities to migrate a process even if the process has not been scheduled for a migration. Such migrations may be performed to save energy by consolidating processes in fewer or more energy-efficient hosts, to improve performance, to avoid predicted failures of hosts or processes, to satisfy a migration policy, or for any other reason. Predictive analysis functions 328 may also be used to avoid migrating to a failed destination host or to a destination host associated with a failing or failed process, which failure may be predicted by predictive analysis functions 328 to occur before, during, or within a start and end time of the migrated process on the destination host. Predictive analysis functions 328 may eliminate such failed hosts, resulting in a different destination host than would otherwise have been selected for the migration. Predictions may also be made on the source host. For example, predictive analysis model 330 may be used to analyze the source host and the process executing on the source host that is to be migrated from the source host to the destination host. In some examples, predictive analysis model 330 may predict that the source host or the migrating process is likely to fail before, during, or within a start and end time of a scheduled migration. Thus, in some examples, results 332 may indicate a predicted time of failure of a migrating process, a predicted time of migration that would avoid the predicted time of failure, a predicted maximum runtime before failure (which can be added to the process start time to predict a failure time), a predicted maximum remaining runtime before failure (from which a predicted amount of migration time may be subtracted to determine a predicted migration time that avoids the predicted failure time), or any other indications that may directly or indirectly be used to schedule a migration time that would avoid a predicted failure of the source host or the migrating process.

As a further example, predictive analysis model 330 may use a predictive analysis function 328 based on a regression model to predict a quantity, such as an amount of time ahead of a given timeframe within which a process is predicted to complete. Predictive analysis model 330 may also use a predictive analysis function 328 based on an unsupervised learning classification model, described in more detail below, to find processes within the historical data that possess similar traits as the migrating process. In some examples, only historical data of processes that were successfully migrated are analyzed by predictive analysis model 330, i.e., predictive analysis function 328 or predictive analysis model 330 may exclude failed runs from their analysis. In some examples, the historical data includes both successful and failed migrations so that predictive analysis function 328 may be trained to identify and distinguish between characteristics of successful versus failed migrations, thereby improving the ability of predictive analysis function 328 to predict whether a process being analyzed is likely to be successful or not. While several classification techniques and types of predictions have been described herein, such description is exemplary only, and any other suitable classification techniques may be used to perform any prediction including those already described.

In unsupervised learning, the true class of an input is unknown, and the classes are inferred from the input dataset, which may be unstructured. Such inputs may be normalized, for example, by rescaling (min-max normalization), mean normalization, standardization, or other method of normalization. In rescaling, the minimum value in a range may be subtracted from a value of interest to obtain an intermediate value. Then, the intermediate value is divided by the difference between the difference in the maximum and minimum values in the range to obtain a normalized value. Mean normalization is similar, except that the mean value in a range is subtracted from the value of interest instead. Standardization is similar in concept, and may be well-suited for machine learning functions such as support vector machines, logistic regression, and artificial neural networks. In standardization, the distribution mean is subtracted from a value of interest to obtain an intermediate value. Then the intermediate value is divided by the standard deviation of the distribution to obtain the standardized value.

Unsupervised learning may use a clustering technique to group unlabeled inputs based on similarity or distance. For example, unsupervised learning may be used to group similar processes into clusters based on one or more historical data parameters, such as total transfer size and network bandwidth, although any combination and any number of historical data parameters may be used. Thus, there may be a first cluster of processes that has a small total transfer size and small network bandwidth, a second cluster that has a large total transfer size and small network bandwidth, a third cluster that has a large total transfer size and large network bandwidth, and a fourth cluster that has a small total transfer size and large network bandwidth. Here, "small" and "large" are used to illustrate how the clusters may fall into distinct groups. "Small" and "large" may be any value or range of values that define a cluster. Other combinations of parameters may be tested to determine the set of parameters that results in the clearest clustering or largest separation distance between the clusters. Each cluster may be further subject to additional iterations of grouping based on other parameters to tease out the key characteristics of processes that dispose them to completion ahead of a given timeframe. For example, unsupervised learning may reveal that some percentage of processes (e.g., 70%) that have a large total transfer size and small network bandwidth do not complete ahead of a given timeframe, whereas some percentage of processes (e.g., 90%) that have a small total transfer size and large network bandwidth do complete ahead of a given timeframe.

If the result of the first clustering is not sufficiently selective, further clustering may be performed on each of the clusters according to more parameters until sufficient selectivity is achieved. Selectivity may be measured by the results of the clustering crossing a predetermined threshold. In this example, clustering according to transfer size and network bandwidth reveals that only 50% or 60% of the processes complete ahead of a given timeframe, which may be below a predetermined selectivity threshold of, e.g., 90%. Thus, further clustering may be performed on the processes in each such cluster where the predetermined selectivity threshold is not reached, such as the cluster of processes having a large transfer size and large network bandwidth. Further clustering may, for example, be performed according to the number of iterations and the size of each iteration, although any other combination and any number of historical data parameters may be used. Such further clustering may reveal that some percentage of processes (e.g., 93%) in a cluster of processes having a small number of iterations and a small size for each iteration completed within some amount of time (e.g., 8 minutes) ahead of a given timeframe. Since the selectivity in this example, 93%, exceeds the predetermined 90% threshold, no further clustering may be required. Thus, the end result of such clustering may be a plurality of clusters having different combinations of attributes, and each cluster may be associated with an amount of time in advance that the processes have historically completed ahead of a given timeframe at a predetermined threshold probability. As each process in the cluster is associated with its own amount of time in advance within which that process has completed ahead of time, the cluster may use an average, minimum, maximum, or other statistically representative value to represent the amounts of time in advance that the processes in the cluster complete ahead of time. Thus, actual (non-test) process data from a migrating or executing process, such as data from first process 108, processes 112, or second process 316, may be clustered by the predictive analysis model 330 using a predictive analysis function 328 applying an unsupervised learning model to determine a cluster within which the migrating process falls. The amount of time that the migrating process is predicted to complete ahead of time may be based on the cluster's representative amount of time for the processes within that cluster. Such a prediction may be made with a level of certainty equivalent to the predetermined threshold probability.

Figure 4:
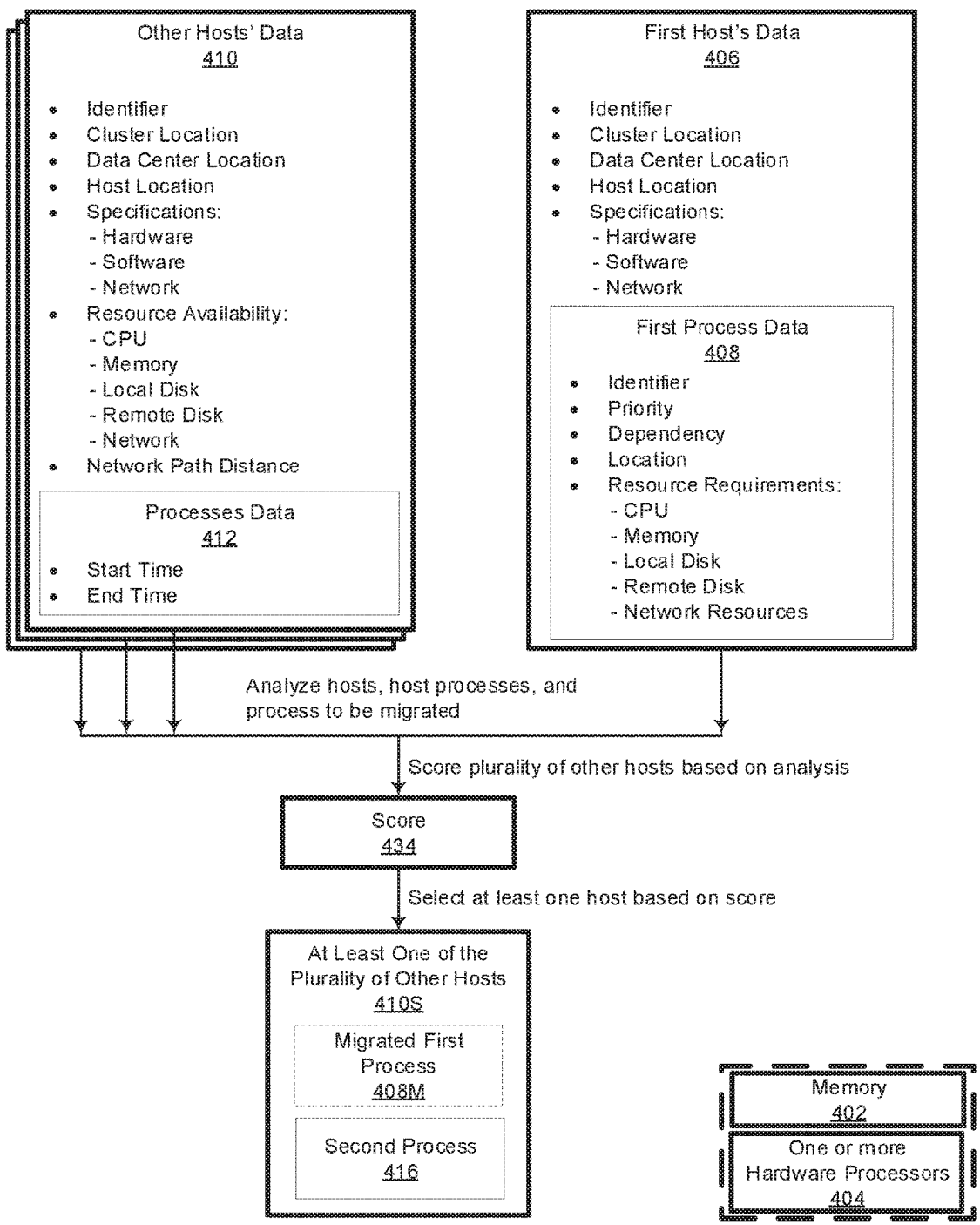
FIG. 4 is an organizational diagram illustrating a system for selecting a host.

FIG. 4 is an organizational diagram illustrating a system 400 for selecting a host, in accordance with various examples of the present disclosure. The system 400 includes a non-transitory memory 402 and one or more hardware processors 404 coupled to the non-transitory memory 402, which are similar to those described with respect to FIG. 1. In the present example, the one or more hardware processors 404 executes instructions from the non-transitory memory 402 to perform operations for analyzing, by a machine learning function, the metadata associated with the source code to predict a likelihood of success of the source code. System 400 may also include additional elements, such as those described with respect to FIGS. 1 and 4, and system 400 may further be used in conjunction with method 200 described with respect to FIG. 2.

FIG. 4 shows different types of data that may be analyzed and scored to select a host to which to migrate a process. In some examples, data corresponding to hosts, including first host's data 406 and other hosts' data 410, and data corresponding to processes executing or running on the respective hosts, including first process data 408 and processes data 412, are analyzed and scored to select at least one of the other hosts to which to migrate a process, such as first process corresponding to first process data 408 and first host corresponding to first host's data 406 to other host corresponding to other hosts' data 410.

First host's data 406 may include the first host's identifier, cluster location, data center location, host location, regulatory or compliance requirements, costs, and specifications. The first host's identifier may be any name, serial number, hash, text string, alphanumeric string, or any other way to identify the first host. The first host's cluster location, data center location, and host location may specify a physical or logical location of the first host. Physical locations may be described with varying degrees of particularity or generality, ranging from global positioning system (GPS) coordinates or other coordinates, a physical rack space, a room, a city, a country, a geographical region, or any other kind of physical location. Non-physical locations include logical or virtual locations. Such logical or virtual locations may similarly be described with varying degrees of particularity or generality, ranging from memory pages, storage partition, local or remote directories, local or remote folders, file system location, MAC address or other local network address, IP address or other remote network address, uniform resource locator (URL) address, or any other kind of logical or virtual location. In some examples, a host may be a single computer workstation or server including non-transitory memory, similar to non-transitory memory 402, and one or more hardware processors, similar to one or more hardware processors 404. A host, such as first host corresponding to first host's data 406, may host one or more processes, such as first process corresponding to first process data 408. A data center may include a collection of multiple hosts. Each of the hosts in a data center may be located in different locations. The data center location may be specific, such as a single physical data center building, or general, such as an area in which a data center is located. A cluster may include a plurality of data centers or hosts. Thus, a host location is generally more specific than a data center location, which is generally more specific than a cluster location.

First host's data 406 may include regulatory or compliance requirements. In some examples, such requirements may include country-based export compliance requirements, data security requirements, accounting rules requirements, financial reporting requirements, environmental requirements, legal requirements, or any other types of regulatory or compliance requirements.

First host's data may include costs. In some examples, such costs may include operating expenses and capital expenses relating to the host, data center, or cluster. Such operating and capital expenses may further be broken down into server cost, networking equipment cost, network provider or internet cost, power distribution cost, cooling cost, cost of power, infrastructure cost, land lease cost, land remediation cost, overhead cost, people cost, software cost, disaster recovery cost, cost of regulatory compliance, or any other costs associated with running a host, data center, or cluster.

First host's data 406 may also include specifications of the first host corresponding to first host's data 406. For example, the specifications may include hardware, software, and or network specifications. Hardware specifications may include information about a CPU or virtual CPU (vCPU), including (v)CPU type, (v)CPU speed, (v)CPU clock speed multiplier, (v)CPU clock speed multiplier locked or unlocked status, number of (v)CPUs, number of (v)CPU cores, (v)CPU multithreading capability, or any other information about a (v)CPU. Hardware specifications may also include information about memory or virtual memory, including (virtual) memory type, (virtual) memory speed, (virtual) memory capacity, (virtual) memory timing, (virtual) memory configuration, or any other information about the (virtual) memory. Hardware specifications may further include information about local and remote storage, including storage media, storage type, storage speed, storage RAID configuration, storage location, storage bandwidth, storage network path distance, or any other information about storage. Software specifications may include information about a software, including operating system, operating system version, migration manager software type, migration manager software version, virtualization environment, or any other information about software. Network specifications may include information about a network, including connection type, connection speed, latency, bandwidth, availability, or any other information about the network.

First process data 408 may include information about an identifier, a priority, a dependency, a location, and resource requirements. The identifier information may include similar information as the identifier in first host's data 406, except with respect to the first process corresponding to first process data 408. The priority information may include an indicator specifying the priority of the first process corresponding to first process data 408, such as "mission critical," "high," "medium," "low," or none. The indicator may be in any form, such as a number, a text string, alphanumerical, a symbol, a flag, a hash value, etc. The dependency information may include the numbers, types, identifiers, sizes, and other information about the dependencies used by first process corresponding to first process data 408. For example, the dependency information may use "0" to signal that there are no dependencies, "1" to signal that there are data dependencies, and "2" to signal that there are other types of dependencies.

First process data 408 may include the location at which the first process data 408 is executing or running. Such location may include a physical or non-physical location. For example, the location of first process data 408 may indicate that the first process corresponding to first process data 408 is executing in a host identified by its identifier, cluster location, data center location, host location, or any other identifying or locational information of the host.

Other hosts' data 410 may include information about an identifier, cluster location, data center location, host location, regulatory or compliance requirements, costs, and specifications of an "other" host, i.e., a host other than the host corresponding to first host's data. Such identifier, cluster location, data center location host location, regulatory or compliance requirements, costs, and specifications may be similar to those of first host's described above.

Other hosts' data 410 may also include resource availability information, such as an amount of CPU, memory, local disk, remote disk, and network resources available. CPU resources available may indicate a number of available CPUs or virtual CPUs, (v)CPU type, (v)CPU speed, (v)CPU clock speed multiplier, (v)CPU clock speed multiplier locked or unlocked status, number of (v)CPUs, number of (v)CPU cores, (v)CPU multithreading capability, or any other information about a CPU or vCPU. Resource availability information may also include information about available memory or virtual memory, including (virtual) memory type, (virtual) memory speed, (virtual) memory capacity, (virtual) memory timing, (virtual) memory configuration, or any other information about the (virtual) memory. CPUs and memory may be clustered into physical or virtual non-uniform memory access (NUMA) nodes. Such NUMA nodes may be identified using an identifier and a physical or virtual address to denote their cluster location. Resource availability information may further include information about local and remote storage, including storage media, storage type, storage speed, storage RAID configuration, storage location, storage bandwidth, storage network path distance, or any other information about storage. Network availability may include information about a network, including available connection type, connection speed, latency, bandwidth, availability, or any other information about the network. Other hosts' data may also include a network path distance between the destination host (e.g., one of the other hosts corresponding to other hosts' data 410) and the source host of the migrating process (e.g., the host corresponding to first host's data 406). Network path distance may be measured in terms of a number of hops between the destination host and the source host, a latency, or any other measure of travel time or travel distance between the two.

Other hosts' data 410 may include processes data 412. Processes data 412 may include data about the processes running on the other hosts corresponding to other hosts' data 410. For examples, processes data 412 may include information about processes launching, executing, or scheduled to execute on other hosts corresponding to other hosts' data 410. For example, virtual machines may be spun up (started) and spun down (terminated) or leased for a fixed period of time to run processes on demand. Thus, processes data 412 may include the scheduled start and end time of a process such as a virtual machine.

The system 400 may analyze first host's data 406, first process data 408, other hosts' data 410, and processes data 412, to generate a score 434 upon which at least one of the other hosts corresponding to other hosts' data 410 is selected as a destination host to receive a migrating process. For example, the locations of the cluster, data center, and host of the other hosts may be compared against the same of the source host from which a process is to be migrated, and the host that is located closest to the source host may receive the highest location score, while hosts that are located farther away may be awarded a lower, zero, or negative score, or may even be excluded from further consideration. Similarly, the host which has the shortest network path distance to the source host may be awarded the highest network path distance score, and other hosts that have a longer network path distance may receive a lower, zero, or negative score, or may even be excluded from further consideration. The host whose specifications most exceed those of the source host may be awarded the highest specification score, while hosts with lesser specifications may be awarded a lower, zero, or negative score, or may even be excluded from further consideration. In some examples, the host whose resource availability most exceeds the resource requirements of the migrating process may be given the highest resource score, and hosts with fewer resources to spare may receive a lower, zero, or negative score, or may even be excluded from further consideration. Such a scoring system may be used to distribute processes to hosts with the most excess resources, which may result in load balancing and increased performance of the processes if the selected host has a higher resource availability than the source host. In some examples, the host whose resource availability least exceeds the resource requirements of the migrating process may be given the highest resource score, and hosts with more resources to spare may receive a lower, zero, or negative score, or may even be excluded from further consideration. Such a scoring system would favor hosts which most exactly match the resource requirements of the migrating process, which might lead to consolidation, energy-efficiency, and cost-savings, if the selected host has less excess resources than the source host.

Scoring may also be based on processes data 412. Processes data 412 may include information about processes executing or running on other hosts. For example, processes data 412 may include a single process's start time and end time, or a plurality of process' start times and end times. Such start times and end times may be predicted start times or end times (e.g., using the predictive analysis techniques described with respect to FIG. 3 as applied to corresponding historical data). Thus, the host whose processes' start or end times are most compatible with the start and end times of a migrating process may receive the highest score, while other hosts with less compatible start or end times may receive a lower, zero, or negative score, or may even be excluded from further consideration. The start and end times of the migrating process may refer to the start and end times of migrating, launching, executing, or scheduling to execute the migrating process prior to or after migration. In some examples, a large buffer between the start or end times of a process executing on a destination host is preferred, thus a destination host offering the largest buffer is deemed most compatible and may receive the highest score. An effect of such a preference is to more evenly distribute processes across hosts, which may improve overall performance and reduce the impact of a single host failure. In some examples, a small buffer is preferred, thus a destination host offering the smallest buffer is deemed most compatible and may receive the highest score. An effect of such a preference is to minimize idle time, which increases efficiency and reduces cost.

Individual scores (e.g., location score, network path distance score, etc.) may be individually weighted. The weighted individual scores may then be summed to generate a composite score. Score 434 includes individual scores and the composite score. Based on score 434, at least one destination host may be selected to which the migrating process will be migrated. The destination host may be one of other hosts corresponding to other hosts' data 410. In other words, at least one of the plurality of other hosts 410S may be selected to receive, or be selected as eligible to receive, the migrating first process corresponding to first process data 408.

The at least one of the plurality of other hosts 410S may be launching, executing, or scheduled to execute a second process 416. In some examples, the second process 416 may be one of the processes corresponding to processes data 412. In some examples, the second process 416 launches, executes, or is scheduled to executed after the analysis or scoring, in which case the second process 416 and the host on which it is executing may be re-analyzed and re-scored. To minimize idle time, the start time of a migration may be scheduled to take place as soon as possible after the second process 416 completes. As described above, predictive analysis techniques may be used to predict a completion time of the second process 416. The predicted completion time may be based on a similar scoring system that scores the historic data parameters to generate individual scores or a composite score. The historic data parameters may be assigned different weights. In some examples, a first score range corresponds with a first amount of time within which a process is at or above a predetermined likelihood threshold to complete, a second score range corresponds with a second amount of time, and so on and so forth. A predicted completion time may be obtained by adding the predicted amount of time within which the process is expected to complete to the start time of the process. If the predicted completion time of the second process 416 is later than the current time but earlier than or equal to the current time incremented by the amount of time to migrate first process corresponding to first process data 408, then a migration time may be scheduled. In some examples, the migration start time may be any time between the current time and the predicted completion time of the second process 416. In some examples, the migration end time may be any time between the predicted completion time of the second process 416 and the predicted completion time of the second process 416 incremented by the amount of time to migrate the first process. The first process may be migrated to the at least one of the plurality of other hosts 410S at the scheduled migration time, and may continue executing on the at least one of the plurality of other hosts 410S (e.g., migrated first process 408M).

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
    selecting, based on an analysis of a first process launching, scheduled to execute, or executing on a first host, at least one of a plurality of other hosts to which to migrate the first process, the selecting being further based on an analysis of the plurality of the other hosts and an analysis of a second process launching, executing, or scheduled to execute on at least one of the plurality of the other hosts;
    predicting, using at least one predictive analysis technique, an amount of time to complete migrating the first process to the selected at least one of the plurality of other hosts and an end time of the second process;
    in response to determining that a current time incremented by the predicted amount of time to complete migrating the first process is later than or equal to the predicted end time of the second process, scheduling a migration time at which to migrate the first process from the first host to the selected at least one of the plurality of other hosts, such that the first process is scheduled to begin its migration in advance of the predicted end time of the second process running on the selected at least one of the plurality of other hosts; and
    performing, at the scheduled migration time, the migration of the first process from the first host to the selected at least one of the plurality of other hosts.

2. The method of claim 1, wherein the scheduling migration of the first process is further in response to determining that a remaining post-migration run time of the first process is greater than a threshold.

3. The method of claim 1, wherein the at least one predictive analysis technique used to predict the amount of time to complete migrating the first process to the selected at least one of the plurality of other hosts is different from the at least one predictive analysis technique used to predict the end time of the second process.

4. The method of claim 1, wherein the predicting includes training the predictive analysis technique using historical data corresponding to previous process migrations, the historical data including data selected from the group consisting of: process start time, process end time, migration start time, migration end time, estimated pause start time, estimated pause end time, time per iteration, iteration migration start time, iteration migration end time, number of iterations, source location, destination location, a score, memory transfer start time, memory transfer end time, total transfer size, initial transfer size, indication of migration success or failure, failure code or reason, CPU usage, remote disk usage, local disk usage, memory usage, and network usage.

5. The method of claim 4, wherein the historical data includes data of processes other than the second process.

6. The method of claim 1, wherein the analysis of the first process, the analysis of the plurality of the other hosts, or analysis of the processes executing on the plurality of the other hosts include analyzing data selected from the group consisting of: an identifier of a process; a priority of a process; a dependency of a process; a location of a process; resources required by a process, including CPU, remote disk, local disk, memory, or network resources;
resources available to a host, including CPU, remote disk, local disk, memory, or network resources, a network path distance between a source host and a destination host; a start time of a process executing on the destination host; an end time of a process executing on the destination host; a data center location; a cluster location; a host location; hardware specifications; software specifications; and network specifications.

7. The method of claim 1, wherein the selecting is further based on a score.

8. The method of claim 1, wherein the selecting includes predicting, using the predictive analysis technique, that a failure will occur in the first host or in one or more of the plurality of other hosts.

9. The method of claim 8, wherein the selected at least one of the plurality of other hosts is not predicted to fail.

10. A system comprising:
a non-transitory memory; and
one or more hardware processors coupled to the non-transitory memory to execute instructions from the non-transitory memory to perform operations comprising:
  selecting, based on an analysis of a first process launching, scheduled to execute, or executing on a first host, at least one of a plurality of other hosts to which to migrate the first process, the selecting being further based on an analysis of a second process launching, scheduled to execute, or executing on at least one of the plurality of other hosts;
  predicting, using a predictive analysis technique, an amount of time to complete migrating the first process to the selected at least one of the plurality of other hosts and an end time of the second process, wherein the predicting includes analyzing historical data;
  determining, based on the predicted amount of time to complete migrating the first process, that the migration of the first process will be completed as soon as or after the second process ends;
  in response to the determining, scheduling a migration time at which to migrate the first process, such that the first process is scheduled to begin its migration in advance of the predicted end time of the second process running on the selected at least one of the plurality of other hosts;
  performing, at the scheduled migration time, the migration of the first process from the first host to the selected at least one of the plurality of other hosts.

11. The system of claim 10, wherein the predictive analysis technique includes a technique selected from the group consisting of: regression techniques, classification and regression trees (CART), linear regression model, multivariate adaptive regression splines, discrete choice models, multivariate adaptive regression splines, logistic regression, machine learning techniques, multinomial logistic regression, neural networks, probit regression, multilayer perceptron (MLP), logit versus probit, radial basis functions, time series models, support vector machines, survival or duration analysis, naïve Bayes, k-nearest neighbors, and geospatial predictive modeling.

12. The system of claim 10, wherein the first process and the second process include a virtual machine.

13. The system of claim 10, wherein the first host and the plurality of other hosts include a virtual machine host.

14. The system of claim 10, wherein a score corresponding to the plurality of the other hosts is obtained based on the analysis of a first process executing on a first host, the analysis of the plurality of the other hosts, and the analysis of processes executing on the plurality of the other hosts.

15. The system of claim 14, wherein the selected at least one of a plurality of other hosts has the highest score.

16. The system of claim 14, wherein a higher resource availability score is associated with a higher amount of resources in excess of resource requirements, and a lower resource availability score is associated with a lower amount of resources in excess of resource requirements.

17. The system of claim 16, wherein the selected at least one of the plurality of other hosts has a higher resource availability than the first host.

18. A non-transitory machine-readable medium having stored thereon machine-readable instructions executable to cause at least one machine to perform operations comprising:
  predicting a migration duration of a first process launching, scheduled to execute, or executing on a first host and a completion time of a second process launching, scheduled to execute, or executing on a second host, wherein the predicting includes applying a predictive analysis technique to historical data corresponding to prior process migrations;
  in response to determining, based on the predicted migration duration, that a time at which the migration of the first process will be completed is later than or equal to the predicted completion time of the second process, scheduling the migration of the first process at a migration time, such that the first process is scheduled to begin its migration in advance of the predicted end time of the second process running on the second host; and migrating, at the scheduled migration time, the first process from the first host to the second host.

19. The non-transitory machine-readable medium of claim 18, wherein the migration of the first process from the first host to the second host results in improved load balancing, energy efficiency, or fault tolerance among a plurality of hosts.

20. The non-transitory machine-readable medium of claim 18, wherein host eligibility is determined based on an analysis of the first process, an analysis of the processes executing on a plurality of hosts including the plurality of eligible hosts, and an analysis of the plurality of hosts.

* * * * *